US012668340B2

(12) United States Patent
Amma

(10) Patent No.: US 12,668,340 B2
(45) Date of Patent: Jun. 30, 2026

(54) MARINE VESSEL

(71) Applicant: YAMAHA HATSUDOKI KABUSHIKI KAISHA, Iwata (JP)

(72) Inventor: Hirofumi Amma, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 181 days.

(21) Appl. No.: 18/204,424

(22) Filed: Jun. 1, 2023

(65) Prior Publication Data

US 2023/0391433 A1 Dec. 7, 2023

(30) Foreign Application Priority Data

Jun. 2, 2022 (JP) ................................ 2022-090218

(51) Int. Cl.
*H01Q 1/34* (2006.01)
*B63B 34/10* (2020.01)
*B63C 9/00* (2006.01)

(52) U.S. Cl.
CPC ............ *B63C 9/0005* (2013.01); *B63B 34/10* (2020.02); *H01Q 1/34* (2013.01)

(58) Field of Classification Search
CPC .......... B63C 9/0005; B63B 34/10; H01Q 1/34
See application file for complete search history.

(56) References Cited

U.S. PATENT DOCUMENTS 4,101,894 A * 7/1978 Warner .................. G01S 1/685 455/99
4,871,996 A * 10/1989 Tsunamoto .............. G08B 7/00 200/52 A
5,193,215 A * 3/1993 Olmer ...................... G01S 1/68 340/996
6,612,256 B1 * 9/2003 Martin ................... B63B 43/14 114/68
7,814,856 B1 * 10/2010 Smith .................... B63G 8/001 114/313
8,156,885 B1 4/2012 Beach
12,397,888 B1 * 8/2025 Azatyan ................. G05D 1/495
2009/0295603 A1 * 12/2009 Clark ...................... B63B 45/04 340/984
2015/0094886 A1 4/2015 Anma
2015/0250254 A1 * 9/2015 Huber .................... A62B 9/022 2/422

FOREIGN PATENT DOCUMENTS

CA 1205686 A * 6/1986 ............... B63C 9/06
GB 2430063 A * 3/2007 ............... H01Q 1/34
JP 61-222324 A 10/1986
JP 2003-137194 A 5/2003
JP 2015-067263 A 4/2015
JP 2017-030433 A 2/2017
JP 2020-013339 A 1/2020
KR 20240039704 A * 3/2024 ........... G08B 21/182
KR 20250121035 A * 8/2025 ............ G05D 1/689
WO 2007/029005 A1 3/2007

* cited by examiner

*Primary Examiner* — Brian A Zimmerman
(74) *Attorney, Agent, or Firm* — Keating & Bennett, LLP

(57) ABSTRACT

A marine vessel to improve a transmission characteristic of a rescue signal when the marine vessel is capsized includes a transmission source to transmit a rescue signal to a vicinity above a water surface both when the marine vessel is not capsized and when the marine vessel is capsized.

4 Claims, 13 Drawing Sheets

35

MARINE VESSEL

CROSS REFERENCE TO RELATED APPLICATIONS

This application claims the benefit of priority to Japanese Patent Application No. 2022-090218, filed on Jun. 2, 2022. The entire contents of this application are hereby incorporated herein by reference.

BACKGROUND OF THE INVENTION

1. Field of the Invention

The present invention relates to a marine vessel that transmits a rescue signal.

2. Description of the Related Art

A small marine vessel, for example, a small jet-propelled planing boat may be capsized due to external disturbances or the like, and in this case, a marine vessel operator of the planing boat falls into the water (falls overboard) from the planing boat. Further, in the case that the marine vessel operator who has fallen into the water (has fallen overboard) cannot return to the planing boat in a short time, since there is a possibility that it is necessary to rescue the marine vessel operator, a planing boat which transmits (sends out) a rescue signal when it is stopped in an emergency or when it is capsized is known. Such a planing boat is equipped with a lanyard switch and a capsized switch, and when an engine of the planing boat is stopped by the lanyard switch or the capsized switch, the planing boat instructs a mobile terminal of the marine vessel operator to transmit (send out) a rescue signal, and the mobile terminal wirelessly transmits (sends out) the rescue signal in response to this instruction (for example, see Japanese Laid-Open Patent Publication (kokai) No. 2015-67263).

Furthermore, recently in the field of marine vessels, the development of connected technology that allows timely connections between marine vessels and servers to exchange information has progressed, and even small marine vessels are increasingly equipped with cellular data communication modules (DCMs: Data Communication Modules), which are communication terminals. In such a small marine vessel, the DCM wirelessly transmits a rescue signal when the engine of the small marine vessel is stopped by the lanyard switch or the capsized switch.

In the small marine vessel, although the mobile terminal is usually stored in a waterproof storage box on a hull of the small marine vessel, since the storage box is often submerged below the water surface when the marine vessel is capsized radio waves (the rescue signal) transmitted from the mobile terminal will be attenuated underwater such that there is a possibility that it will be difficult for the rescue signal to reach the rescue request destination.

In addition, in the case that the DCM is provided at a location on the hull that will be submerged below the water surface when the marine vessel is capsized, the rescue signal transmitted from the DCM will be attenuated underwater when the marine vessel is capsized such that there is a possibility that it will be difficult for the rescue signal to reach the rescue request destination.

Thus, there is still room for improvement in terms of a transmission characteristic of the rescue signal when the marine vessel is capsized.

SUMMARY OF THE INVENTION

Preferred embodiments of the present invention provide marine vessels that are each able to improve a transmission characteristic of a rescue signal when the marine vessel is capsized.

According to a preferred embodiment of the present invention, a marine vessel includes a transmission source to transmit a rescue signal to a vicinity above a water surface both when the marine vessel is not capsized and when the marine vessel is capsized.

According to another preferred embodiment of the present invention, a marine vessel includes a communicator to communicate externally of the marine vessel and transmit a rescue signal, and a transmission source different from the communicator to transmit the rescue signal. The transmission source is located above a water surface when the marine vessel is capsized.

According to the preferred embodiments of the present invention described above, since the transmission source is able to transmit the rescue signal to above the water surface even when the marine vessel is capsized, it is possible to improve the transmission characteristic of the rescue signal when the marine vessel is capsized, or, since the transmission source is located above the water surface even when the marine vessel is capsized, the transmission source is able to transmit the rescue signal from above the water surface, and as a result, it is possible to improve the transmission characteristic of the rescue signal when the marine vessel is capsized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
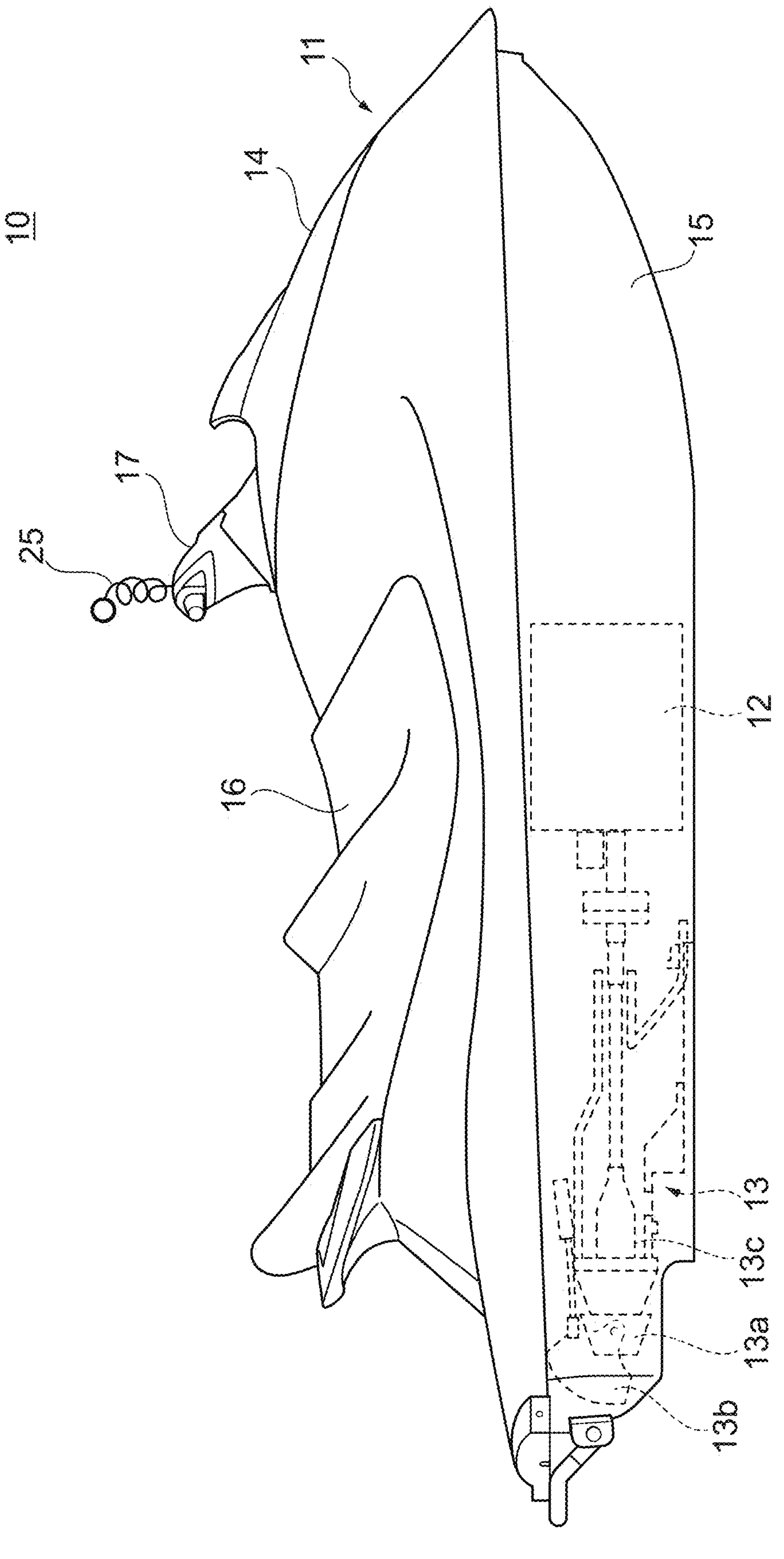
FIG. 1 is a side view of a jet propulsion boat according to a first preferred embodiment of the present invention.

First, a first preferred embodiment of the present invention will be described. FIG. 1 is a side view of a jet propulsion boat 10 according to the first preferred embodiment of the present invention.

In FIG. 1, the jet propulsion boat 10 is a so-called personal watercraft (PWC). The jet propulsion boat 10 includes a hull 11, an engine 12, and a jet propulsion mechanism 13.

The hull 11 includes a deck 14 and a hull 15. A saddle type seat 16 is attached to the deck 14, and the seat 16 is located above the engine 12. A steering handle 17 to steer the hull 11 is located on the deck 14, and the steering handle 17 is located in front of the seat 16. The steering handle 17 includes a left handlebar 19 extending in the left direction of the hull 11 and a right handlebar 18 extending in the right direction of the hull 11.

Figure 2:
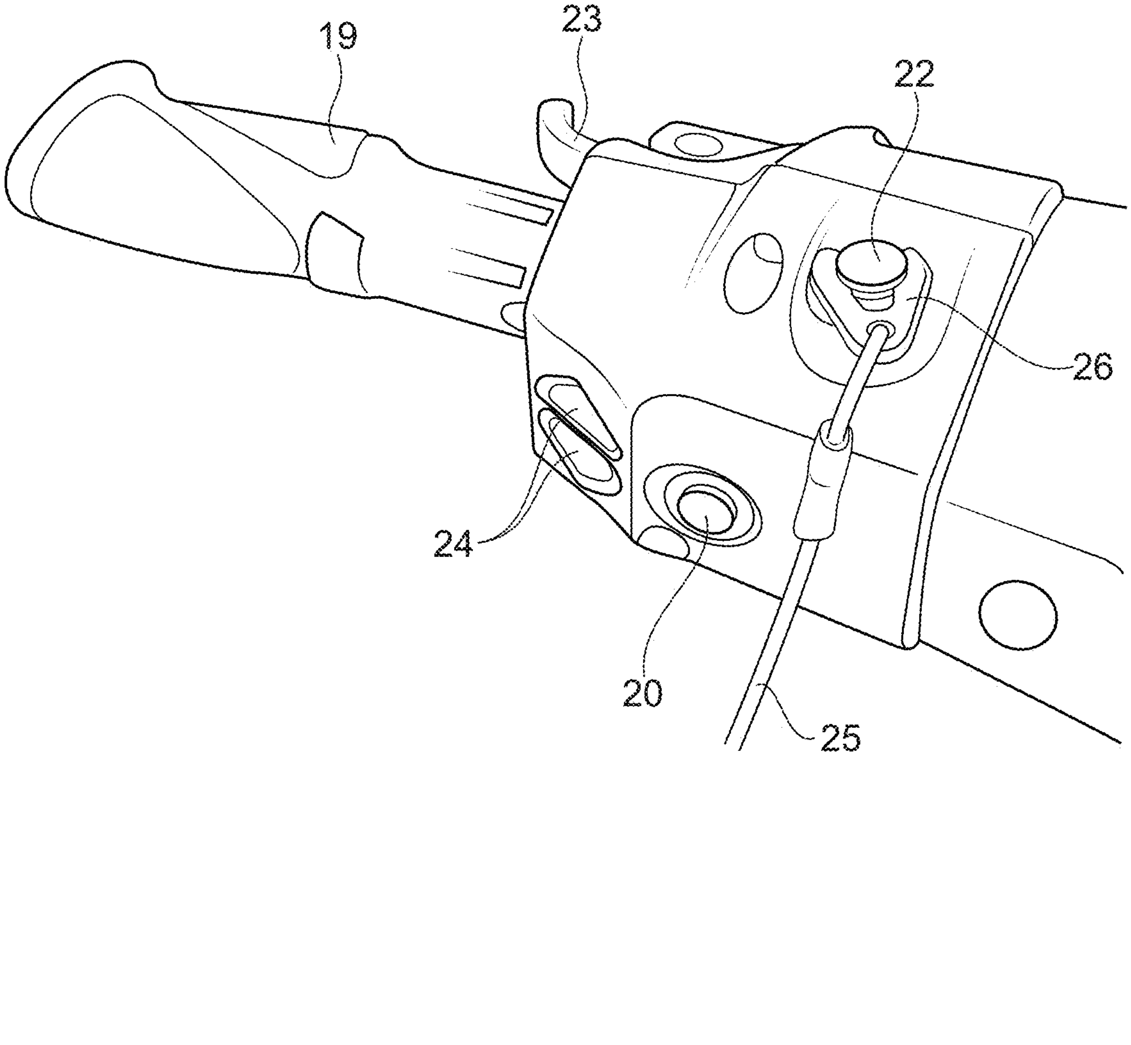
FIG. 2 is an enlarged partial perspective view of a left handlebar of the jet propulsion boat of FIG. 1 when viewed obliquely from the rear right and above.
Figure 3:
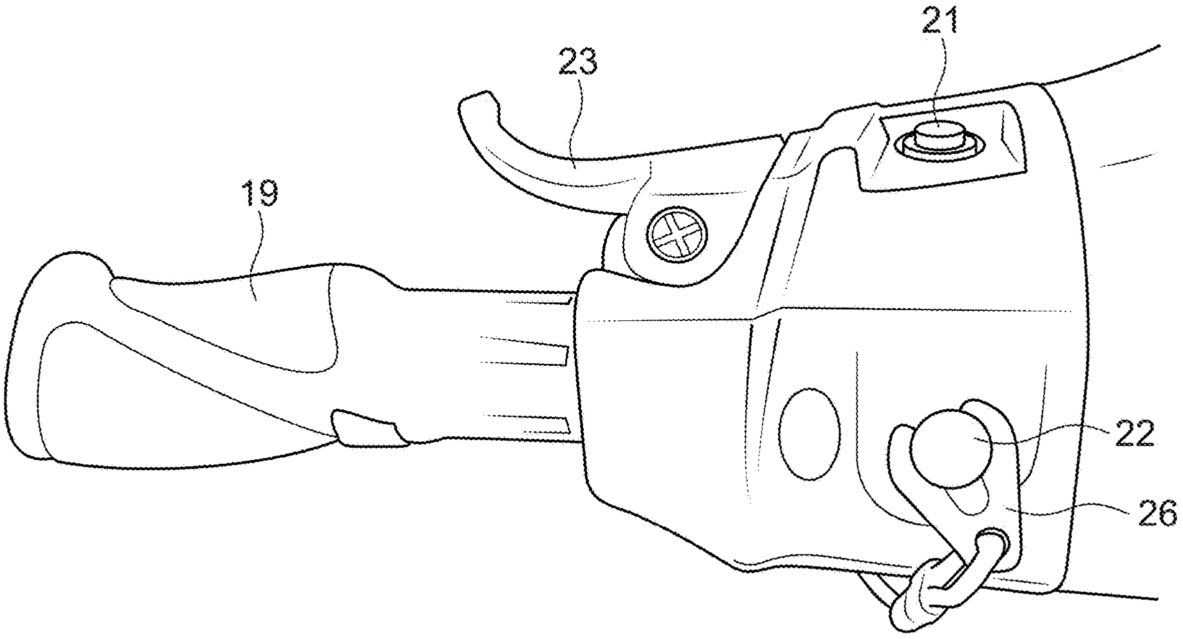
FIG. 3 is a partially enlarged view of the left handlebar of the jet propulsion boat of FIG. 1 when viewed from above.

FIGS. 2 and 3 are enlarged partial perspective views that show the configuration of the vicinity of the left handlebar 19, FIG. 2 shows the left handlebar 19 when viewed obliquely from the rear right and above, and FIG. 3 shows the left handlebar 19 when viewed from above.

A start switch 20, a stop switch 21, a lanyard switch 22, a reverse lever 23, and a trim switch 24 are provided in the vicinity of the left handlebar 19 as operating elements. These operating elements are located so that all of them are able to be operated with fingers of the left hand when a marine vessel operator holds (grips) the left handlebar 19 with the left hand.

The start switch 20 starts the engine 12 and may include, for example, a push button. When the marine vessel operator presses the start switch 20 to activate it, a starter motor (not shown) located inside the hull 11 is activated, and the starter motor starts the engine 12. The stop switch 21 stops the engine 12 and may be, for example, a push button. When the marine vessel operator presses the stop switch 21 to activate it, the engine 12 stops.

The lanyard switch 22 is an emergency stop switch to stop the engine 12, and is biased toward the steering handle 17 by an internal biasing element. The lanyard switch 22 is prevented from moving toward the steering handle 17 by engaging with a forked hook 26 at one end of a lanyard 25 that is usually tied around the wrist or the like of the marine vessel operator. For example, when the marine vessel operator falls off the jet propulsion boat 10 (falls overboard from the jet propulsion boat 10) and the hook 26 is disengaged, the lanyard switch 22 moves toward the steering handle 17 due to an urging force (a biasing force) and stops the engine 12 by transmitting an engine emergency stop signal to a BCU (Boat Control Unit) 31 which will be described below.

The reverse lever 23 moves a reverse gate 13*b* that covers a jet nozzle 13*a* of the jet propulsion mechanism 13. When the reverse lever 23 is pulled, the reverse gate 13*b* moves so as to cover the jet nozzle 13*a*, and reverses the water current jetted from the jet nozzle 13*a* to an area forward of the hull 11. As a result, the jet propulsion boat 10 moves backward. The trim switch 24 changes the orientation of the jet nozzle 13*a* in a vertical direction, and is used to adjust a trim (a longitudinal inclination angle) of the hull 11.

Figure 4:
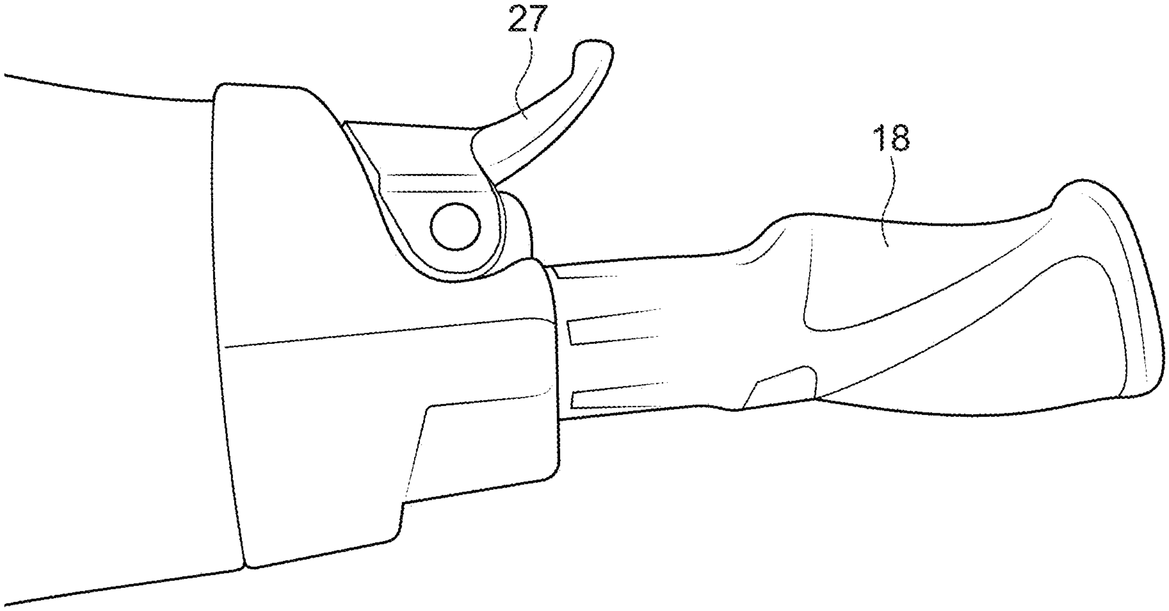
FIG. 4 is a partially enlarged view of a right handlebar of the jet propulsion boat of FIG. 1 when viewed from above.

FIG. 4 is an enlarged partial perspective view that shows the configuration of the vicinity of the right handlebar 18, and shows the right handlebar 18 when viewed from above. A throttle lever 27 is provided in the vicinity of the right handlebar 18 as an operating element. The throttle lever 27 is located so that it is able to be operated with fingers of the right hand when the marine vessel operator holds (grips) the right handlebar 18 with the right hand.

The throttle lever 27 adjusts the output of the engine 12, and the marine vessel operator operates the throttle lever 27 by pulling the throttle lever 27. A rotation number of the engine 12 changes according to how the marine vessel operator pulls the throttle lever 27 (that is, in response to the extent to which the throttle lever 27 is pulled by the marine vessel operator).

Figure 5:
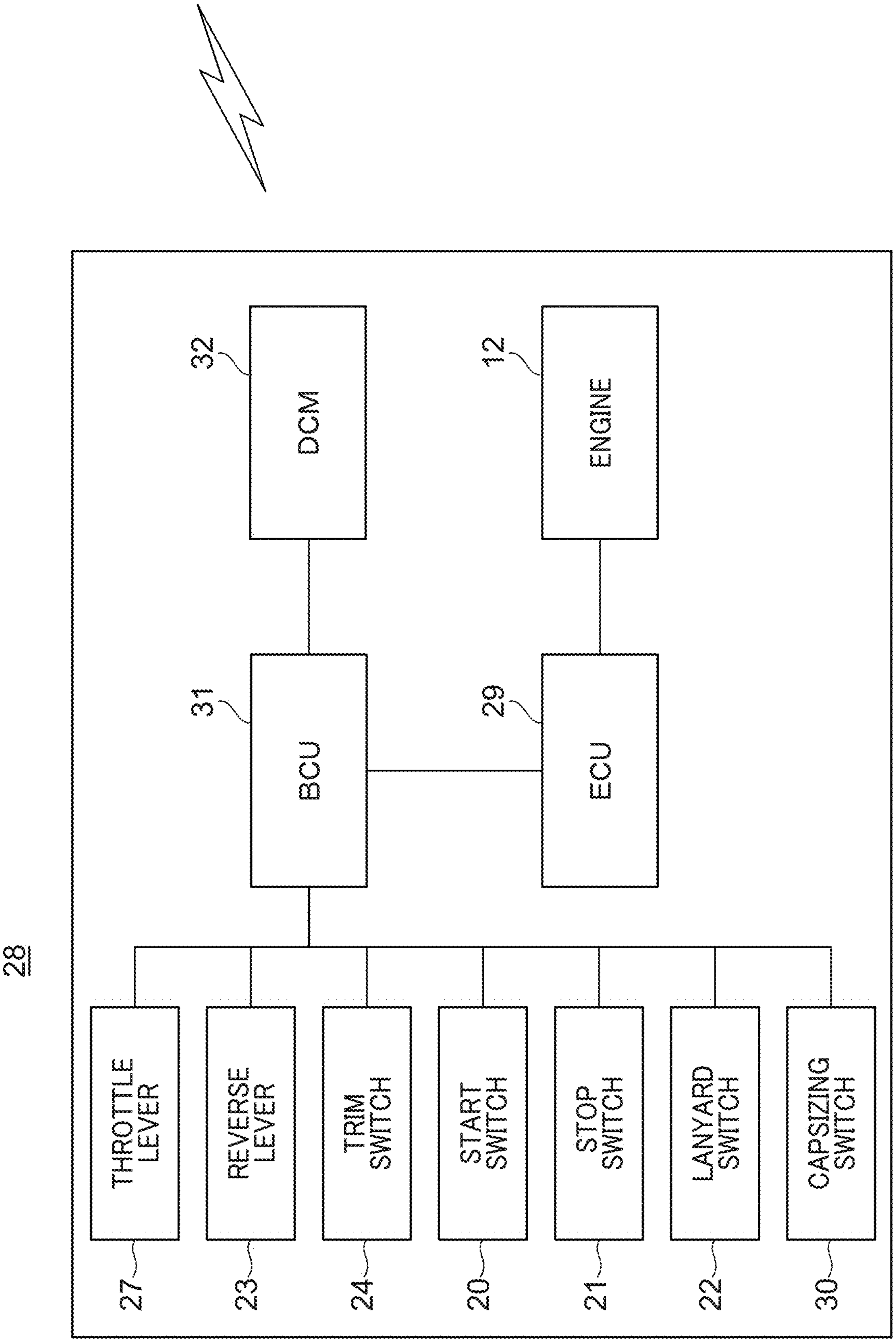
FIG. 5 is a block diagram that schematically shows a configuration of a control system of the jet propulsion boat of FIG. 1.

FIG. 5 is a block diagram that schematically shows a configuration of a control system 28 of the jet propulsion boat 10 of FIG. 1. The control system 28 includes an ECU (Engine Control Unit) 29 that functions as a controller of the engine 12, and the ECU 29 controls the rotation number of the engine 12. The engine 12 rotates an impeller 13*c* of the jet propulsion mechanism 13, and the rotating impeller 13*c* generates the water flow jetted from the jet nozzle 13*a*. Accordingly, the ECU 29 controls a marine vessel speed of the jet propulsion boat 10 by controlling the rotation number of the engine 12 to control a flow rate of the water current.

The control system 28 includes the BCU 31 (a controller) to which the start switch 20, the stop switch 21, the lanyard switch 22, the reverse lever 23, the trim switch 24, and the throttle lever 27 are connected. The BCU 31 controls the jet propulsion boat 10 according to instructions from the marine vessel operator based on signals transmitted from respective switches and respective levers of the control system 28, and determines the magnitude of a propulsive force to be generated by the engine 12 and transmits it to the ECU 29.

The control system 28 includes a capsized switch 30, and a DCM 32 (functioning as not only a transmission source but also a communication unit) which is a communication terminal. The capsized switch 30 detects that the hull 11 has been capsized, and transmits a detection result that the hull 11 has been capsized to the BCU 31. When the BCU 31 receives the detection result that the hull 11 has been capsized from the capsized switch 30, the BCU 31 transmits a signal to stop the engine 12 to the ECU 29 and externally of the jet propulsion boat 10. The DCM 32 is a cellular data communication module able to perform wireless communications conforming to a predetermined communication standard. For example, the DCM 32 is able to perform communications conforming to the "International Mobile Telecommunication (IMT)-Advanced" standard (the so-called 4G standard) defined by the International Telecommunication Union (ITU), or communications conforming to the "IMT-2020" standard (the so-called 5G standard) defined by ITU. The DCM 32 transmits a rescue signal in response to an instruction from the BCU 31. It should be noted that the DCM 32 may be a communication module that performs communications conforming to a communication standard other than the communication standards described above.

In the first preferred embodiment of the present invention, in the case that the engine 12 is not restarted by the start switch 20 even after a predetermined period of time has elapsed since the engine 12 has been stopped based on the operation of the lanyard switch 22 or the detection result of the capsized switch 30, the BCU 31 instructs the DCM 32 to transmit the rescue signal.

Figure 6A:
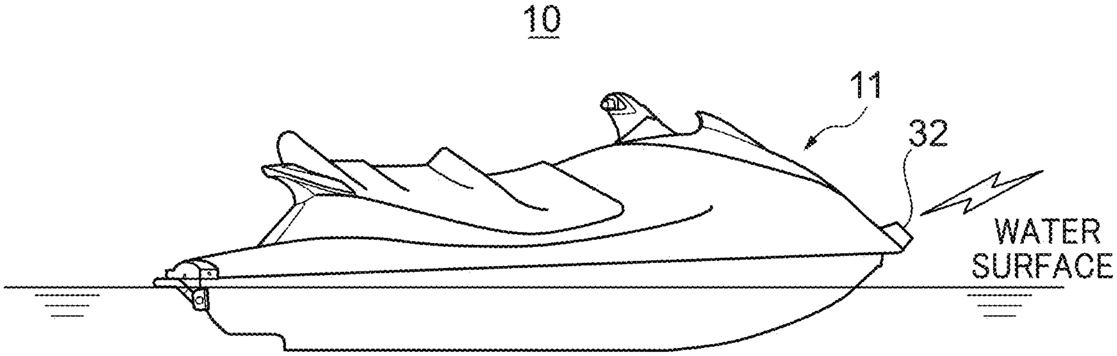
FIGS. 6A and 6B are side views for explaining a configuration of a DCM in the jet propulsion boat of FIG. 1.
Figure 6B:
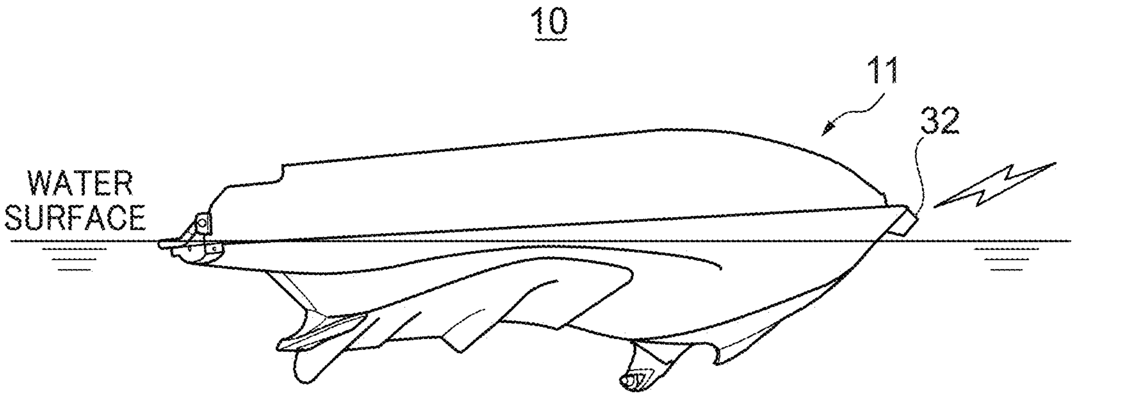

FIGS. 6A and 6B are side views for explaining a configuration of the DCM 32 in the jet propulsion boat 10. As shown in FIGS. 6A and 6B, the DCM 32 is located at a bow of the hull 11. In the jet propulsion boat 10, which is a PWC, a heavy object is disposed on the hull 11 so that the bow is positioned above the water surface both when the jet propulsion boat 10 is not capsized (when the hull 11 is not capsized) and when the jet propulsion boat 10 is capsized (when the hull 11 is capsized). Therefore, in the jet propulsion boat 10, the DCM 32 will not be submerged under the water and will always be positioned above the water surface both when the jet propulsion boat 10 is not capsized (see FIG. 6A) and when the jet propulsion boat 10 is capsized (see FIG. 6B). Thus, the rescue signal transmitted by the DCM 32 is able to reach the vicinity above the water surface such as a marina or another marine vessel without being attenuated underwater even when the jet propulsion boat 10 is capsized. As a result, it is possible to improve the transmission characteristic of the rescue signal when the jet propulsion boat 10 is capsized.

Figure 7A:
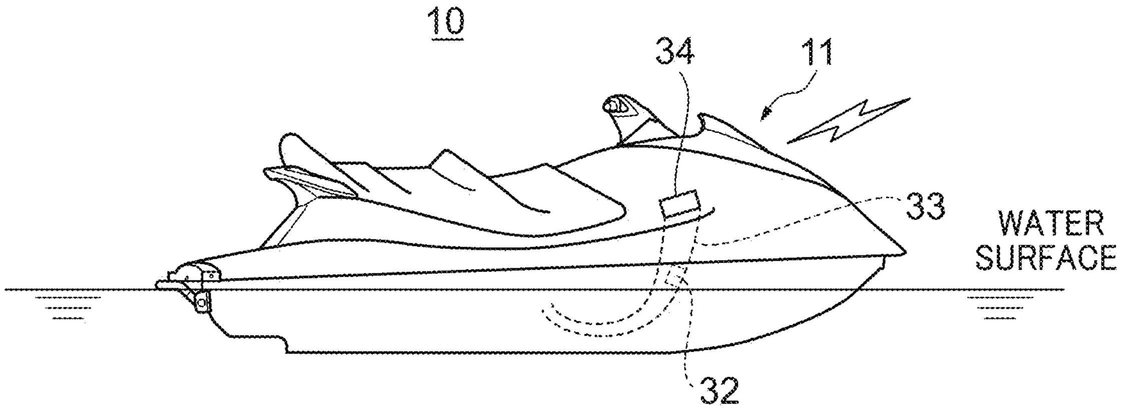
FIGS. 7A and 7B are side views for explaining a modification of the configuration of the DCM in the jet propulsion boat of FIG. 1.
Figure 7B:
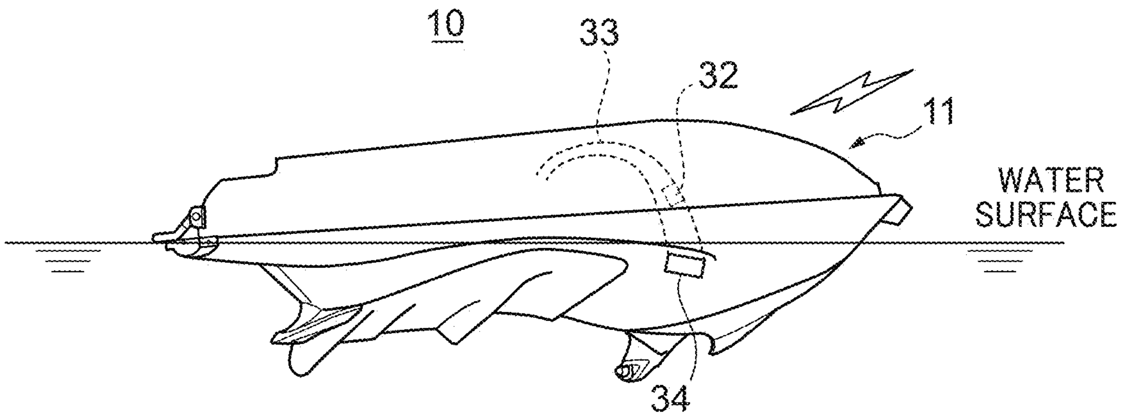

It should be noted that the place where the DCM 32 is located is not limited to the bow of the hull 11 and may be any place above the water surface both when the jet propulsion boat 10 is not capsized and when the jet propulsion boat 10 is capsized. For example, as shown in FIG. 7A, the DCM 32 may be located inside of an intake hose 33 that is an intake path of the engine 12. In the jet propulsion boat 10, since the intake hose 33 is routed with a high rise inside the hull 11 so that water will not be sucked into the engine 12 from an intake port 34 via the intake hose 33 when the jet propulsion boat 10 is capsized, even in the case that the hull 11 is capsized, there is a not-submerged portion between the intake port 34 and the engine 12. The DCM 32 is located at the not-submerged portion (see FIG. 7B). In this case, even if the hull 11 is capsized, the water does not reach the DCM 32 so the rescue signal transmitted by the DCM 32 passes through the inside of the hull 11 and is transmitted to outside of the jet propulsion boat 10 without being attenuated.

Next, a second preferred embodiment of the present invention will be described. The components, operations, and effects of the second preferred embodiment are basically the same as those of the first preferred embodiment described above, and the second preferred embodiment differs from the first preferred embodiment only in that an additional transmission source 36 is provided in addition to the DCM 32. Therefore, the description of duplicate components, operations, and effects will be omitted, and different components, operations, and effects will be described below.

Figure 8:
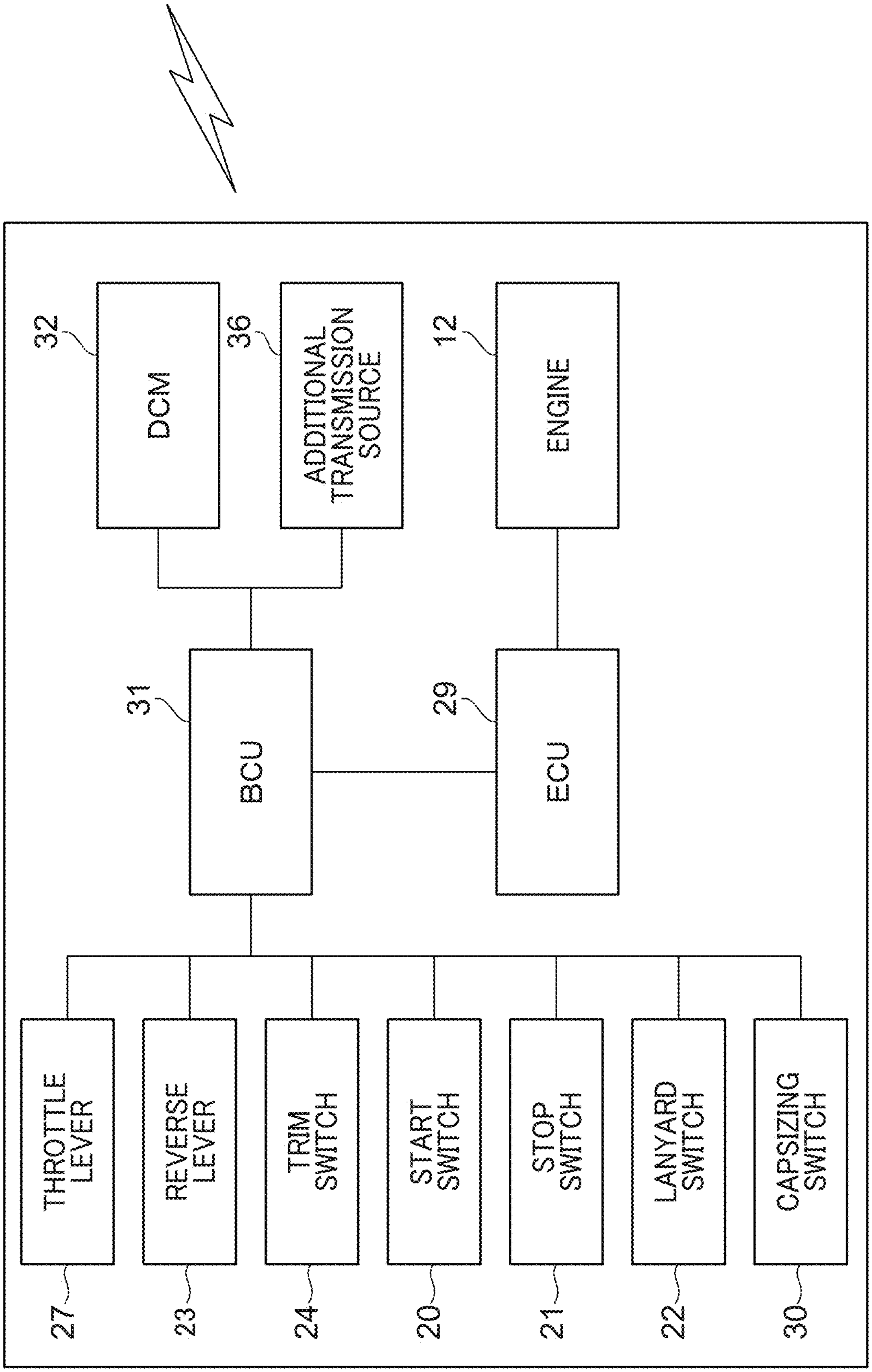
FIG. 8 is a block diagram that schematically shows a configuration of a control system of a jet propulsion boat according to a second preferred embodiment of the present invention.

FIG. 8 is a block diagram that schematically shows a configuration of a control system 35 of the jet propulsion boat 10 according to the second preferred embodiment of the present invention. The control system 35 includes the additional transmission source 36 (functioning as a transmission source) in addition to the DCM 32. The additional transmission source 36 is, for example, a cellular data communication module having a configuration similar to that of the DCM 32, and transmits a rescue signal in response to an instruction from the BCU 31.

In the second preferred embodiment of the present invention, in the case that the engine 12 is not restarted by the start switch 20 even after a predetermined period of time has elapsed since the engine 12 has been stopped based on the operation of the lanyard switch 22 or the detection result of the capsized switch 30, regardless of whether the hull 11 has been capsized or not, the BCU 31 instructs the DCM 32 and the additional transmission source 36 to each transmit the rescue signal to outside of the jet propulsion boat 10.

Figure 9A:
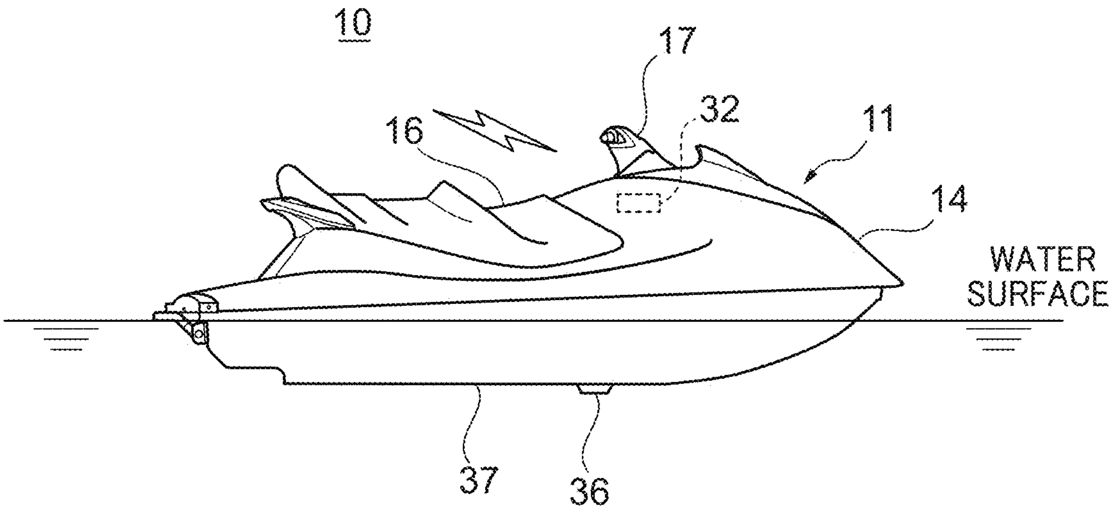
FIGS. 9A and 9B are side views for explaining a configuration of a DCM and an additional transmission source according to the second preferred embodiment of the present invention.
Figure 9B:
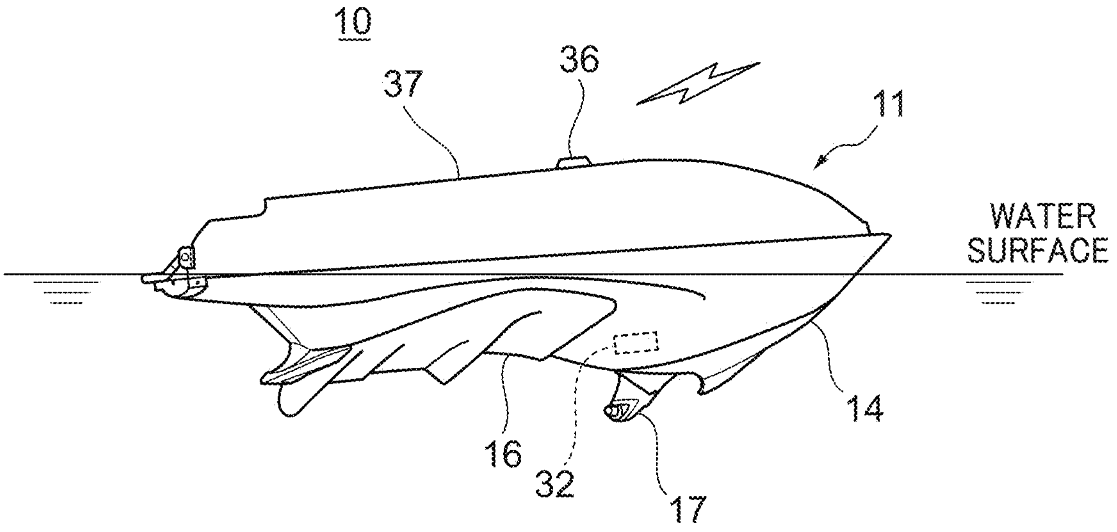

FIGS. 9A and 9B are side views for explaining a configuration of the DCM 32 and the additional transmission source 36 according to the second preferred embodiment of the present invention. As shown in FIGS. 9A and 9B, the DCM 32 is located inside the hull 11 so as to be positioned above the water surface when the jet propulsion boat 10 is not capsized. In addition, the additional transmission source 36 is located on a bottom 37 of the hull 11. Therefore, in the case that the DCM 32 and the additional transmission source 36 transmit the rescue signal when the jet propulsion boat 10 is not capsized, as shown in FIG. 9A, since the additional transmission source 36 is submerged, the rescue signal transmitted by the additional transmission source 36 is attenuated underwater. On the other hand, since the DCM 32 is not submerged, the rescue signal transmitted by the DCM 32 is less attenuated than the rescue signal transmitted by the additional transmission source 36 and is transmitted to outside of the jet propulsion boat 10.

In the case that the DCM 32 and the additional transmission source 36 transmit the rescue signal when the jet propulsion boat 10 is capsized, as shown in FIG. 9B, since the deck 14 is submerged, the DCM 32 is also submerged, and the rescue signal transmitted by the DCM 32 is attenuated underwater. On the other hand, since the bottom 37 is above the water surface due to capsizing, the additional transmission source 36 is positioned above the water surface, and the rescue signal transmitted by the additional transmission source 36 is less attenuated than the rescue signal transmitted by the DCM 32 and is reliably transmitted to the outside.

Both when the jet propulsion boat 10 is capsized and when the jet propulsion boat 10 is not capsized, the rescue signal transmitted by the DCM 32 or the additional transmission source 36 is able to reach the vicinity above the water surface such as a marina or another marine vessel. As a result, it is possible to improve the transmission characteristic of the rescue signal when the jet propulsion boat 10 is capsized.

It should be noted that the place where the DCM 32 is located is not limited to the inside of the hull 11, and may be any place (location) on the surface of the hull 11, for example, on the surface of the deck 14, as long as it is a location positioned above the water surface when the hull 11 is not capsized. In addition, the place where the additional transmission source 36 is located is not limited to the bottom 37 of the hull 11, and may be any location inside the hull 11 as long as it is a location positioned above the water surface when the hull 11 is capsized.

Figure 10A:
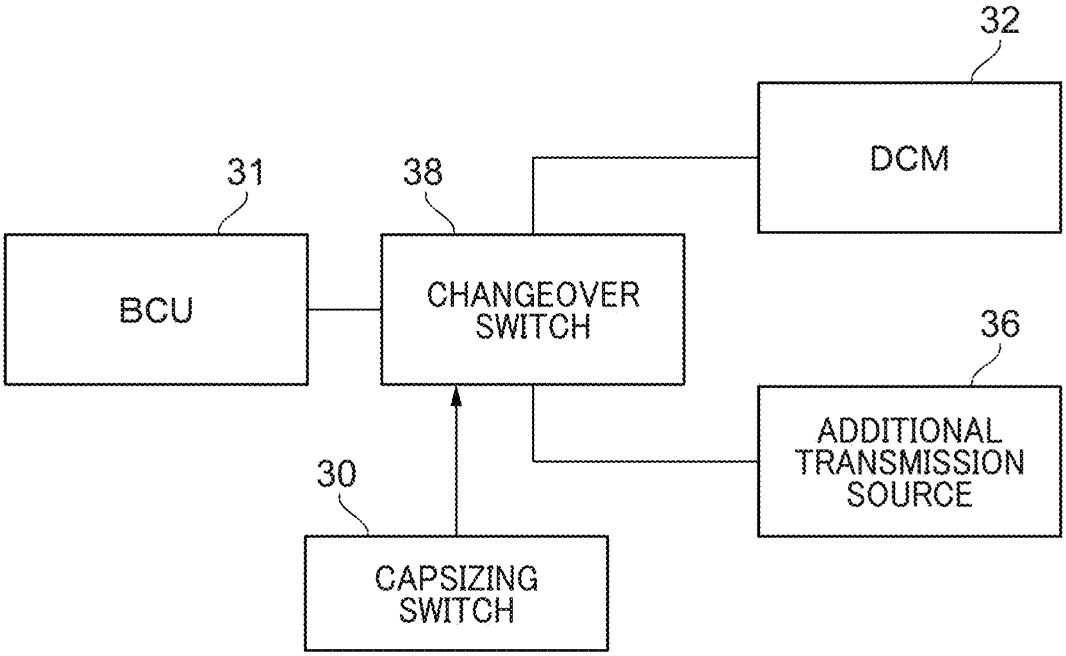
FIGS. 10A and 10B are diagrams for explaining examples in which a portion of the configuration of the control system of the jet propulsion boat according to the second preferred embodiment of the present invention is changed.

In the second preferred embodiment of the present invention, although both the DCM 32 and the additional transmission source 36 transmit the rescue signal regardless of whether the hull 11 has been capsized or not, only one of the DCM 32 and the additional transmission source 36 may transmit the rescue signal depending on whether the hull 11 is capsized or is not capsized. In this case, for example, as shown in FIG. 10A, in the control system 35, a changeover switch 38 is provided between the BCU 31, and the DCM 32 and the additional transmission source 36. In addition, the capsized switch 30 is connected to the changeover switch 38. In the case that the capsized switch 30 does not transmit the detection result to the changeover switch 38, that is, in the case that the hull 11 is not capsized, the changeover switch 38 transmits the instruction from the BCU 31 only to the DCM 32, and as a result, only the DCM 32 transmits the rescue signal. In addition, in the case that the capsized switch 30 transmits the detection result to the changeover switch 38, that is, in the case that the hull 11 is capsized, the changeover switch 38 transmits the instruction from the BCU 31 only to the additional transmission source 36, and as a result, only the additional transmission source 36 transmits the rescue signal.

Figure 10B:
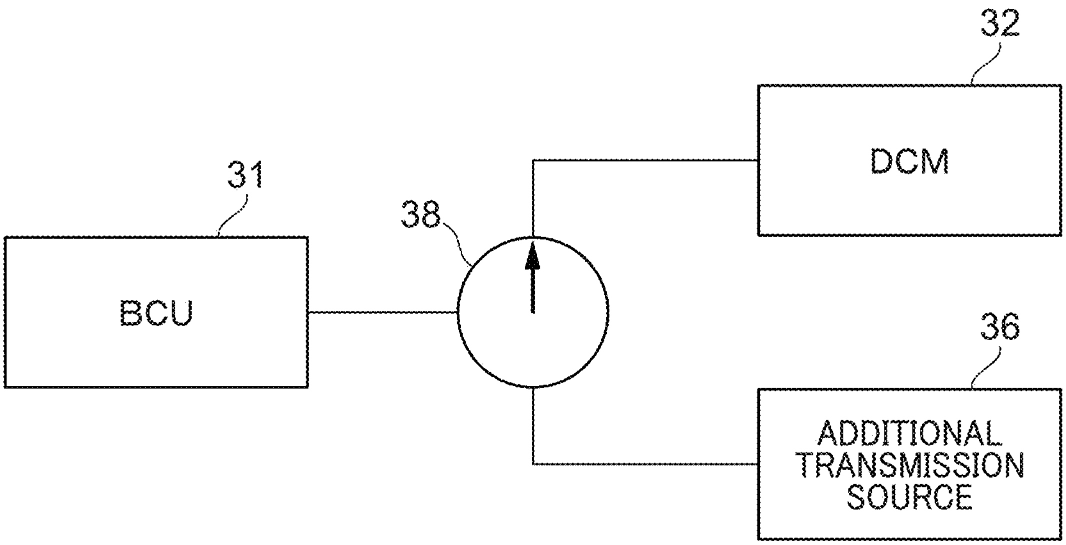

The changeover switch 38 may be mechanically configured, for example, as shown in FIG. 10B, such that the changeover switch 38 includes a pointer that points in a direction opposite to gravity. In the case that the hull 11 is not capsized, the pointer contacts with a contact switch of the DCM 32, and on the other hand, in the case that the hull 11 is capsized, the pointer contacts with a contact switch of the additional transmission source 36. As a result, in the case that the hull 11 is not capsized, the instruction from the BCU 31 reaches only the DCM 32, and only the DCM 32 transmits the rescue signal. On the other hand, in the case that the hull 11 is capsized, the instruction from the BCU 31 reaches only the additional transmission source 36, and only the additional transmission source 36 transmits the rescue signal.

Next, a third preferred embodiment of the present invention will be described. The components, operations, and effects of the third preferred embodiment are basically the same as those of the first preferred embodiment described above, and the third preferred embodiment differs from the first preferred embodiment only in that a mobile terminal is used to transmit a rescue signal instead of the DCM 32. Therefore, the description of duplicate components, operations, and effects will be omitted, and different components, operations, and effects will be described below.

Figure 11:
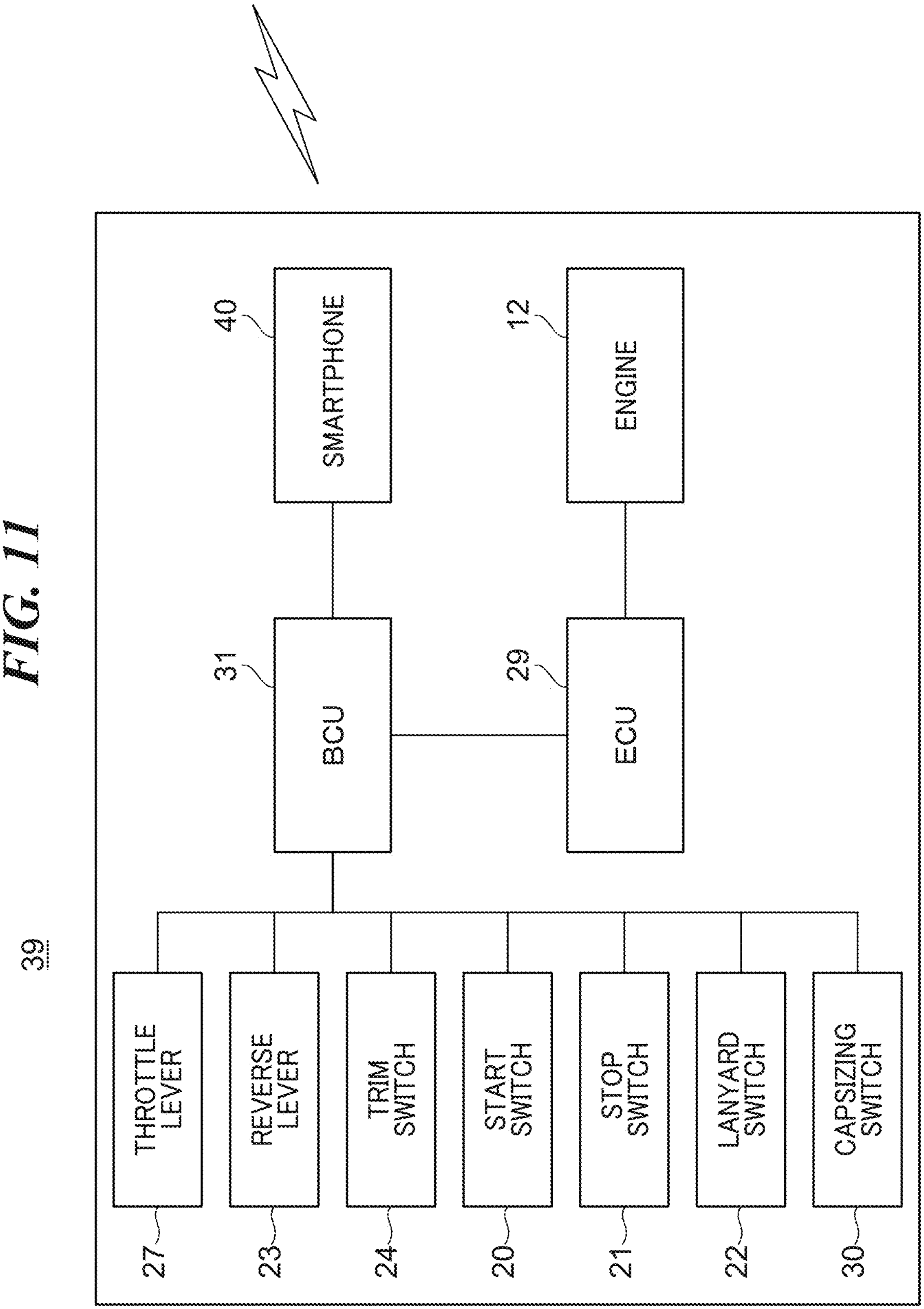
FIG. 11 is a block diagram that schematically shows a configuration of a control system of a jet propulsion boat according to a third preferred embodiment of the present invention.

FIG. 11 is a block diagram that schematically shows a configuration of a control system 39 of the jet propulsion boat 10 according to the third preferred embodiment of the present invention. The control system 39 includes the mobile terminal such as a smartphone 40 (functioning as a communication unit) instead of the DCM 32. The smartphone 40 is wired or wirelessly connected to the BCU 31 and transmits a rescue signal in response to an instruction from the BCU 31.

In the third preferred embodiment of the present invention, in the case that the engine 12 is not restarted by the start switch 20 even after a predetermined period of time has elapsed since the engine 12 has been stopped based on the operation of the lanyard switch 22 or the detection result of the capsized switch 30, regardless of whether the hull 11 has been capsized or not, the BCU 31 instructs the smartphone 40 to transmit the rescue signal to the outside.

Figure 12A:
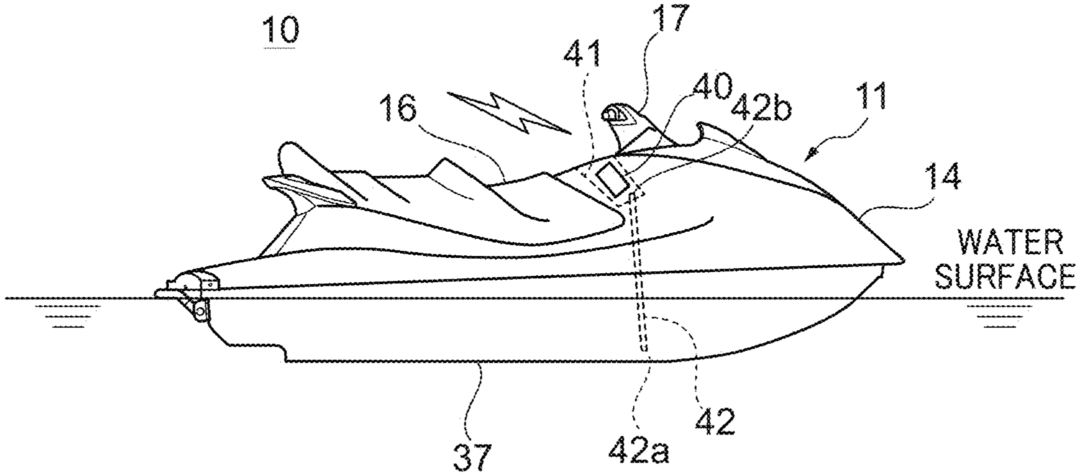
FIGS. 12A and 12B are side views for explaining a configuration of a smartphone according to the third preferred embodiment of the present invention.
Figure 12B:
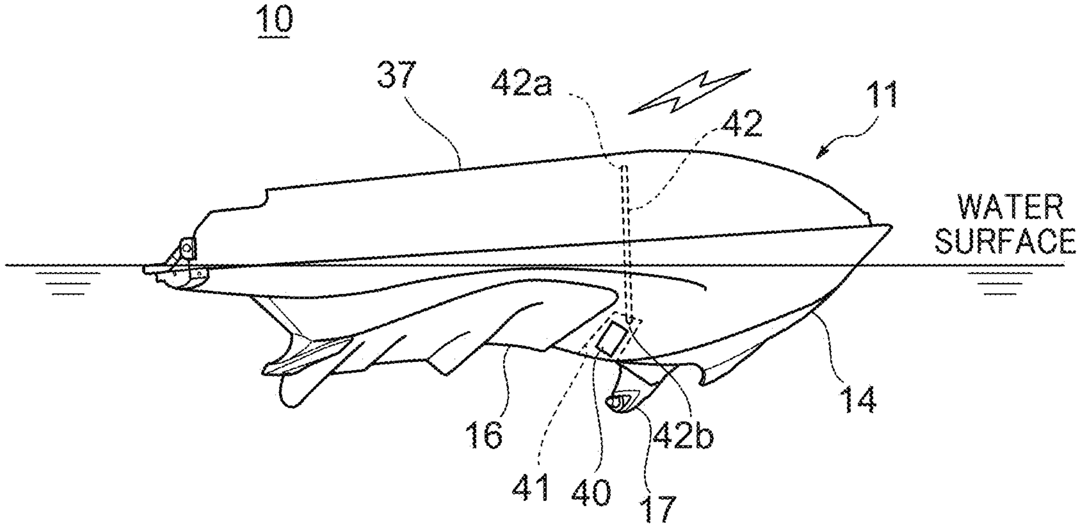

FIGS. 12A and 12B are side views for explaining a configuration of the smartphone 40 in the third preferred embodiment of the present invention. As shown in FIGS. 12A and 12B, the deck 14 of the jet propulsion boat 10 includes a waterproof storage 41 (a storage compartment) which is a recess provided between the seat 16 and the steering handle 17. The waterproof storage 41 is provided with a lid that is able to be opened and closed, and when the lid is closed, the interior of the waterproof storage 41 is sealed such that water is prevented from entering the interior of the waterproof storage 41. The smartphone 40 is housed in the waterproof storage 41.

The jet propulsion boat 10 additionally includes an antenna wire 42 (functioning as a transmission source) routed inside the hull 11 from the waterproof storage 41 toward the bottom 37. An end portion 42*a* of the antenna wire 42 on the side of the bottom 37 is fixed inside the hull 11 and is not exposed at the bottom 37, but the end portion 42*a* on the side of the bottom 37 is located inside the hull 11 so as to be positioned above the water surface when the jet propulsion boat 10 is capsized. Although the antenna wire 42 is covered with a radio wave shield (not shown), the end portion 42*a* on the side of the bottom 37 (a first exposed portion) and an end portion 42*b* exposed inside the waterproof storage 41 (a second exposed portion) are not covered with the radio wave shield, and the core of the antenna wire 42 is exposed.

In the case that the smartphone 40 transmits the rescue signal when the jet propulsion boat 10 is not capsized, as shown in FIG. 12A, since the waterproof storage 41 on the deck 14 is not submerged, the rescue signal transmitted by the smartphone 40 housed in the waterproof storage 41 will not be attenuated.

On the other hand, in the case that the smartphone 40 transmits the rescue signal when the jet propulsion boat 10 is capsized, as shown in FIG. 12B, although the waterproof storage 41 is submerged, the rescue signal transmitted from the smartphone 40 inside the waterproof storage 41 propagates to the end portion 42*b* of the antenna wire 42, travels along the antenna wire 42, and is transmitted from the end portion 42*a* on the side of the bottom 37. At this time, since the end portion 42*a* on the side of the bottom 37 is positioned above the water surface, the rescue signal transmitted from the end portion 42*a* on the side of the bottom 37 is transmitted to the outside without being attenuated.

That is, both when the jet propulsion boat 10 is capsized and when the jet propulsion boat 10 is not capsized, the rescue signal transmitted by the smartphone 40 is able to reach the vicinity above the water surface such as a marina or another marine vessel. As a result, it is possible to improve the transmission characteristic of the rescue signal when the jet propulsion boat 10 is capsized.

Moreover, in the third preferred embodiment of the present invention, since the antenna wire 42 other than the end portion 42*a* and the end portion 42*b* is covered with the radio wave shield, it is difficult for the antenna wire 42 to receive radio waves from anything other than the smartphone 40 housed in the waterproof storage 41, and as a result, it is possible to reduce the possibility that the antenna wire 42 will transmit a signal other than the rescue signal. In the case that the smartphone 40 is equipped with a gyro, instead of the capsized switch 30, the smartphone 40 may detect that the hull 11 has been capsized, and may transmit the detection result that the hull 11 has been capsized to the BCU 31. The end portion 42*a* of the antenna wire 42 on the side of the bottom 37 may not be fixed inside the hull 11 and may be exposed at the bottom 37. In addition, the smartphone 40 may transmit an e-mail or a message requesting help (rescue) instead of the rescue signal.

Next, a fourth preferred embodiment of the present invention will be described. The components, operations, and effects of the fourth preferred embodiment are basically the same as those of the third preferred embodiment described above, and the fourth preferred embodiment differs from the third preferred embodiment only in that an omnidirectional antenna 43 is provided instead of the antenna wire 42. Therefore, the description of duplicate components, operations, and effects will be omitted, and different components, operations, and effects will be described below.

Figure 13A:
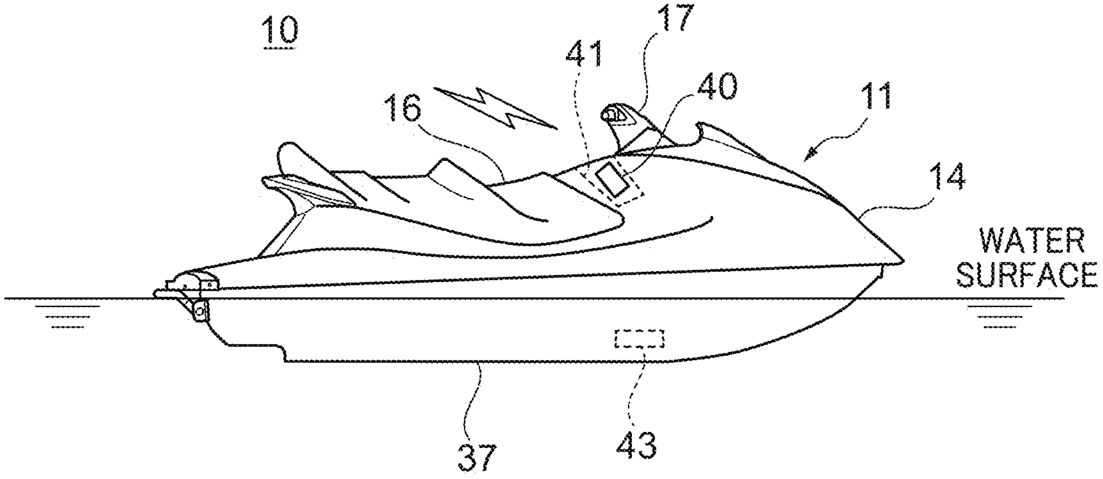
FIGS. 13A and 13B are side views for explaining a configuration of an omnidirectional antenna according to a fourth preferred embodiment of the present invention.
Figure 13B:
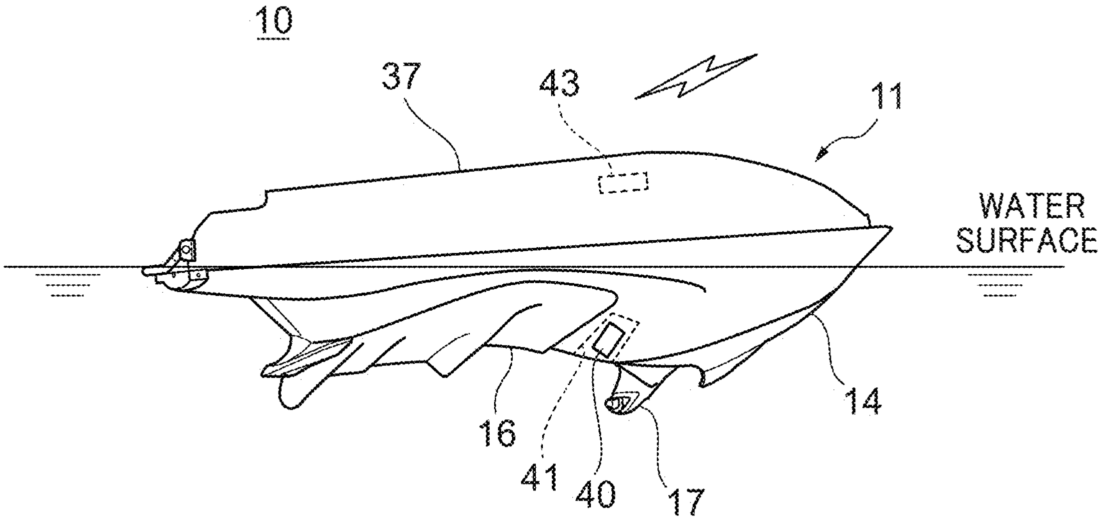

FIGS. 13A and 13B are side views for explaining a configuration of the omnidirectional antenna 43 in the fourth preferred embodiment of the present invention. As shown in FIGS. 13A and 13B, the omnidirectional antenna 43 is located inside the hull 11 so as to be positioned above the water surface when the jet propulsion boat 10 is capsized.

In the fourth preferred embodiment of the present invention, as with the third preferred embodiment of the present invention, in the case that the smartphone 40 transmits the rescue signal when the jet propulsion boat 10 is not capsized, as shown in FIG. 13A, since the waterproof storage 41 on the deck 14 is not submerged, the rescue signal transmitted by the smartphone 40 housed in the waterproof storage 41 will not be attenuated.

On the other hand, in the case that the smartphone 40 transmits the rescue signal when the jet propulsion boat 10 is capsized, as shown in FIG. 13B, although the waterproof storage 41 is submerged, since the interior of the hull 11 is filled with air and almost no water is contained therein, the rescue signal transmitted from the smartphone 40 inside the waterproof storage 41 propagates to the omnidirectional antenna 43 without being attenuated substantially inside the hull 11, and the omnidirectional antenna 43 transmits the rescue signal. At this time, since the omnidirectional antenna 43 is positioned above the water surface, the rescue signal transmitted from the omnidirectional antenna 43 is transmitted to the outside without being attenuated.

That is, as with the third preferred embodiment of the present invention, both when the jet propulsion boat 10 is capsized and when the jet propulsion boat 10 is not capsized, the rescue signal transmitted by the smartphone 40 is able to reach the vicinity above the water surface such as a marina or another marine vessel. As a result, it is possible to improve the transmission characteristic of the rescue signal when the jet propulsion boat 10 is capsized.

In addition, in the fourth preferred embodiment of the present invention, since the antenna wire 42 routed inside the hull 11 is not required, the fourth preferred embodiment is advantageous in terms of layout as compared with the third preferred embodiment. Moreover, in the fourth preferred embodiment of the present invention, in order not to attenuate the rescue signal propagating from the smartphone 40 to the omnidirectional antenna 43, it is preferable not to locate a component, a water pipe, or an oil pipe that contains conductive materials between the waterproof storage 41 and the omnidirectional antenna 43 inside the hull 11.

It should be noted that the place where the omnidirectional antenna 43 is located is not limited to the inside of the hull 11, and may be located at the bottom 37 of the hull 11.

Although preferred embodiments of the present invention have been described above, the present invention is not limited to the above-described preferred embodiments, and various modifications and changes can be made within the scope and the gist thereof.

In the above-described preferred embodiments, although the case that the present invention is applied to a PWC has been described, the present invention is able to be applied to marine vessels other than a PWC that may be capsized.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:

a hull including a portion located above a water surface both when the marine vessel is not capsized and when the marine vessel is capsized; and a single transmission source located at the portion of the hull to transmit a rescue signal via a radio wave to a vicinity above the water surface both when the marine vessel is not capsized and when the marine vessel is capsized.

2. The marine vessel according to claim 1, wherein the single transmission source is located at a bow of the hull of the marine vessel.

3. The marine vessel according to claim 1, wherein the single transmission source is at a not-submerged location of an air intake path provided in the hull of the marine vessel.

4. The marine vessel according to claim 1, wherein the single transmission source is a communicator operable to communicate externally of the marine vessel.

* * * * *